United States Patent
Li et al.

(10) Patent No.: US 10,313,407 B2
(45) Date of Patent: *Jun. 4, 2019

(54) METHOD AND APPARATUS FOR ESTABLISHING A SESSION BETWEEN A THIN CLIENT AND A MEDIA GATEWAY FOR MEDIA DATA STREAMING

(71) Applicant: Huawei Technologies Co., Ltd., Shenzhen (CN)

(72) Inventors: Houqing Li, Xi'an (CN); Youying Li, Xi'an (CN); Chaolin Qiao, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 668 days.

This patent is subject to a terminal disclaimer.

(21) Appl. No.: 14/862,752

(22) Filed: Sep. 23, 2015

(65) Prior Publication Data

US 2016/0014173 A1    Jan. 14, 2016

Related U.S. Application Data

(63) Continuation of application No. 14/145,469, filed on Dec. 31, 2013, now Pat. No. 9,178,925, which is a (Continued)

(51) Int. Cl.
*G06F 15/16* (2006.01)
*H04L 29/06* (2006.01)
(Continued)

(52) U.S. Cl.
CPC ...... *H04L 65/4069* (2013.01); *G06F 9/45558* (2013.01); *H04L 65/103* (2013.01);
(Continued)

(58) Field of Classification Search
CPC ............ H04L 65/4069; H04L 65/1006; H04L 67/1023; H04L 67/10; H04L 65/4084;
(Continued)

(56) References Cited

U.S. PATENT DOCUMENTS 7,742,398 B1 * 6/2010 Tene ................... G06F 9/45537
370/217
8,463,912 B2 * 6/2013 Bharadwaj .............. H04L 29/06
709/203
(Continued)

FOREIGN PATENT DOCUMENTS

| CN | 1870772 A | 11/2006 |
|---|---|---|
| CN | 1893427 A | 1/2007 |

(Continued)

OTHER PUBLICATIONS

Drew, P., et al., "Next-Generation VoIP Network Architecture," MSF Technical Report, MSF-TR-ARCH-001-FINAL, Mar. 7, 2003, 20 pages.
(Continued)

*Primary Examiner* — Lance Leonard Barry
(74) *Attorney, Agent, or Firm* — Conley Rose, P.C.

(57) ABSTRACT

A method and an apparatus for establishing a session between a thin client (TC) and a media gateway for media stream data transmitting are provided. The TC sends media stream transmission information of the TC to the media gateway through a virtual machine (VM), and receives media stream information of the media gateway from the VM. A session between the TC and the media gateway is established. After the session is established, the TC and the media gateway transmit media stream data directly by taste the established session.

20 Claims, 8 Drawing Sheets

A corresponding VM obtains media stream transmission information of a TC from the TC ⟶ 201

The VM sends the media stream transmission information of the TC to a media gateway and sends obtained media stream transmission information of the media gateway to the TC, so that the TC establishes a session between the TC and the media gateway according to the media stream transmission information of the TC and the media stream transmission information of the media gateway, and transmits media stream data by using the established session ⟶ 202

Related U.S. Application Data continuation of application No. PCT/CN2011/077247, filed on Jul. 18, 2011.

(51) Int. Cl.
*H04L 29/08* (2006.01)
*G06F 9/455* (2018.01)

(52) U.S. Cl.
CPC ...... *H04L 65/1006* (2013.01); *H04L 65/1069* (2013.01); *H04L 65/4084* (2013.01); *H04L 65/60* (2013.01); *H04L 65/80* (2013.01); *H04L 67/10* (2013.01); *H04L 67/1023* (2013.01); *G06F 2009/45595* (2013.01)

(58) Field of Classification Search
CPC ..... H04L 65/60; H04L 65/1069; H04L 65/80; H04L 65/103; H04L 65/1023; G06F 9/45558; G06F 2009/45595
See application file for complete search history.

(56) References Cited

U.S. PATENT DOCUMENTS

| | | | |
|---|---|---|---|
| 2008/0172647 A1* | 7/2008 | Roche | G06F 17/30392 717/100 |
| 2010/0023940 A1* | 1/2010 | Iwamatsu | G06F 1/3203 718/1 |
| 2010/0100914 A1* | 4/2010 | Sugiyama | H04L 65/4069 725/109 |
| 2011/0093567 A1 | 4/2011 | Jeon et al. | |
| 2011/0208837 A1* | 8/2011 | Sartori | H04L 49/60 709/219 |
| 2012/0218374 A1* | 8/2012 | Matula | H04L 65/1006 348/14.12 |
| 2013/0326072 A1* | 12/2013 | Smyth | H04L 67/141 709/227 |

FOREIGN PATENT DOCUMENTS

| | | |
|---|---|---|
| CN | 101635635 A | 1/2010 |
| CN | 101917418 A | 12/2010 |

OTHER PUBLICATIONS

"Corporate Telecommunication Networks—Mobility for Enterprise Communications," ECMA International, Ecma/TC32-TG17/2010/056, Ecma/TC32/2010/042, Nov. 4, 2010, 38 pages.

Chen, J., et al., "IMS Cloud Computing Architecture for High-Quality Multimedia Applications," Jul. 4, 2011, pp. 1463-1468.

Foreign Communication From a Counterpart Application, PCT Application No. PCT/CN2011/077247, International Search Report dated Apr. 19, 2012, 2 pages.

Foreign Communication From a Counterpart Application, PCT Application No. PCT/CN2011/077247, Written Opinion dated Apr. 19, 2012, 5 pages.

Foreign Communication From a Counterpart Application, European Application No. 11858045.5, Extended European Search Report dated Mar. 24, 2014, 8 pages.

Foreign Communication From a Counterpart Application, European Application No. 11858045.5, European Office Action dated Mar. 5, 2015, 5 pages.

Foreign Communication From a Counterpart Application, Chinese Application No. 201180001472.3, Chinese Office Action dated Feb. 18, 2013, 5 pages.

Office Action dated Mar. 19, 2015, 10 pages, U.S. Appl. No. 14/145,469, filed Dec. 31, 2013.

Office Action dated Dec. 15, 2014, 22 pages, U.S. Appl. No. 14/145,469, filed Dec. 31, 2013.

Notice of Allowance dated Jun. 25, 2015, 12 pages, U.S. Appl. No. 14/145,469, filed Dec. 31, 2013.

\* cited by examiner

METHOD AND APPARATUS FOR ESTABLISHING A SESSION BETWEEN A THIN CLIENT AND A MEDIA GATEWAY FOR MEDIA DATA STREAMING

CROSS-REFERENCE TO RELATED APPLICATION

This application is a continuation of U.S. application Ser. No. 14/145,469, filed on Dec. 31, 2013, and issued as U.S. Pat. No. 9,178,925, which is a continuation of International Patent Application PCT/CN2011/077247, filed on Jul. 18, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to communications technologies, and in particular, to a method and an apparatus for transmitting media stream data in a cloud computing system.

BACKGROUND

In a cloud computing system, multiple virtual machines (VMs) can run on each physical server, and a cloud terminal, that is, a thin client (TC), can log in to a corresponding VM, for example, the TC logs in to the corresponding VM through the Remote Desktop Protocol, to perform communication services. In the prior art, a VM decodes a downstream data packet that is received through a stream control protocol, to obtain media stream data, then encodes the data and transmits the data to a corresponding TC. On the contrary, the VM decodes a received upstream data packet to obtain media stream data, and then encodes the data and transmits the data to a corresponding media gateway through a stream media transmission protocol.

However, the transmission of media stream data between the TC and the VM increases the transmission delay.

SUMMARY

Embodiments of the present invention provide a method and an apparatus for transmitting media stream data in a cloud computing system, so as to reduce the transmission delay.

In one aspect, the present invention provides a method for transmitting media stream data in a cloud computing system, where the cloud computing system includes a physical server on which at least one VM runs, a TC logs in to the VM, and the method includes: sending, by the TC, media stream transmission information of the TC to the corresponding VM, so that the VM sends the media stream transmission information of the TC to a media gateway; receiving, by the TC, media stream transmission information of the media gateway from the VM; and establishing, by the TC, a session between the TC and the media gateway according to the media stream transmission information of the TC and the media stream transmission information of the media gateway, and transmitting media stream data by using the established session.

In another aspect, the present invention provides a method for transmitting media stream data in a cloud computing system, where the cloud computing system includes a physical server on which at least one VM runs, a TC logs in to the VM, and the method includes: obtaining, by the corresponding VM, media stream transmission information of the TC from the TC; and sending, by the VM, the media stream transmission information of the TC to a media gateway, and sending obtained media stream transmission information of the media gateway to the TC, so that the TC establishes a session between the TC and the media gateway according to the media stream transmission information of the TC and the media stream transmission information of the media gateway, and transmits media stream data by using the established session.

In another aspect, the present invention provides a TC in a cloud computing system, where the cloud computing system includes a physical server on which at least one VM runs, the TC logs in to the VM, and the TC includes: a registering unit configured to send media stream transmission information of the TC to the corresponding VM, so that the VM sends the media stream transmission information of the TC to a media gateway; a receiving unit configured to receive media stream transmission information of the media gateway from the VM; and a transmitting unit configured to establish a session between the TC and the media gateway according to the media stream transmission information of the TC and the media stream transmission information of the media gateway, and transmit media stream data by using the established session.

In another aspect, the present invention provides a VM in a cloud computing system, where the cloud computing system includes a physical server on which at least one VM runs, a TC logs in to the VM, and the VM includes: a registering unit configured to obtain media stream transmission information of the TC from the TC; and a sending unit configured to send the media stream transmission information of the TC to a media gateway and send obtained media stream transmission information of the media gateway to the TC, so that the TC establishes a session between the TC and the media gateway according to the media stream transmission information of the TC and the media stream transmission information of the media gateway, and transmits media stream data by using the established session.

As can be known from the above technical solutions, in the embodiments of the present invention, after the VM obtains the media stream transmission information of the TC from the TC, the VM sends the media stream transmission information of the TC to the media gateway and sends the obtained media stream transmission information of the media gateway to the TC, so that the TC can establish a session between the TC and the media gateway and transmit media stream data by using the established session, thereby reducing the transmission delay. In addition, because media stream data does not pass through the VM, the VM does not need to encode or decode media stream data, and therefore the central processing unit (CPU) occupation rate of the VM will not be high. As a result, the quantity of VMs that can run on a corresponding physical server can be further increased so as to improve the resource utilization rate of the physical server.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
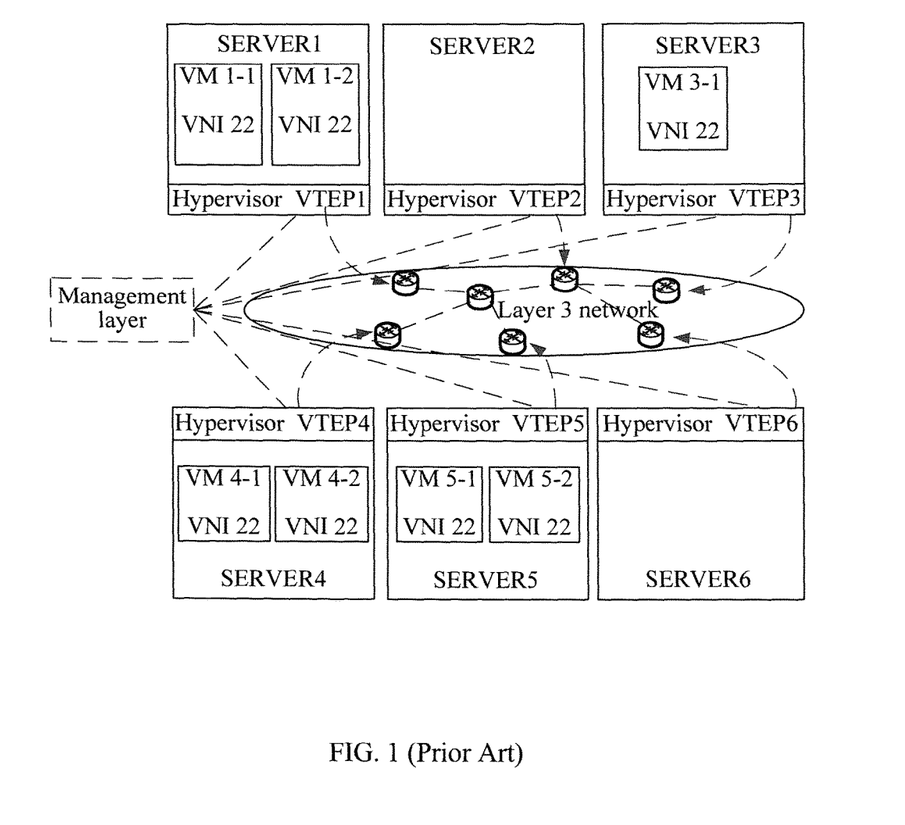
FIG. 1 is a schematic flowchart of a method for transmitting media stream data in a cloud computing system according to an embodiment of the present invention.

FIG. 1 is a schematic flowchart of a method for transmitting media stream data in a cloud computing system according to an embodiment of the present invention. In the cloud computing system, multiple VMs can run on each physical server and a TC can log in to a corresponding VM to perform communication services. As shown in FIG. 1, the method for transmitting media stream data in a cloud computing system in the embodiment of the present invention may include the following steps:

101. A TC sends media stream transmission information of the TC to a corresponding VM, so that the VM sends the media stream transmission information of the TC to a media gateway.

Before step 101, the TC may further obtain configured media stream transmission information of the TC.

The media stream transmission information of the TC may be media stream address information of the TC, for example, address information such as an Internet Protocol (IP) address and a port number, or may further include media stream address information of the TC and media stream codec information supported by the TC, for example, voice codec methods such as G.723.1, G.711, or G.729.

102. The TC receives media stream transmission information of the media gateway from the VM.

The TC may receive the media stream transmission information of the media gateway from the VM by using a media control protocol, such as an H.248 protocol, a Session Initiation Protocol (SIP), or a Media Gateway Control Protocol (MGCP).

The media stream transmission information of the media gateway may be media stream address information of the media gateway, for example, address information such as an IP address and a port number, or may further include media stream address information of the media gateway and media stream codec information supported by the media gateway, for example, voice codec methods such as G.723.1, G.711, or G.729.

103. The TC establishes a session between the TC and the media gateway according to the media stream transmission information of the TC and the media stream transmission information of the media gateway, and transmits media stream data by using the established session.

Optionally, the TC may send the media stream address information of the TC and the media stream codec information supported by the TC to the VM, the VM then sends the media stream address information of the TC and the media stream codec information supported by the TC to the media gateway, and then the TC receives the media stream address information of the media gateway and the media stream codec information supported by the media gateway from the VM. The TC and the VM perform codec method negotiation and select a codec method they both support, so that according to the media stream address information of the TC and the media stream address information of the media gateway, the TC encodes, by using the selected codec method, media stream data to be sent and sends the encoded media stream data to the media gateway, and decodes, by using the selected codec method, encoded media stream data received from the media gateway to obtain the media stream data.

Optionally, the TC may not send media stream codec information supported by the TC to the VM, or, the VM may not send media stream codec information supported by the media gateway to the TC. That is, in scenarios where the TC does not obtain the media stream codec information supported by the media gateway, one codec method supported by the TC may be used. If the media gateway or the TC cannot decode media stream data correctly, another codec method is selected until the media gateway and the TC can both decode media stream data correctly.

Figure 9:
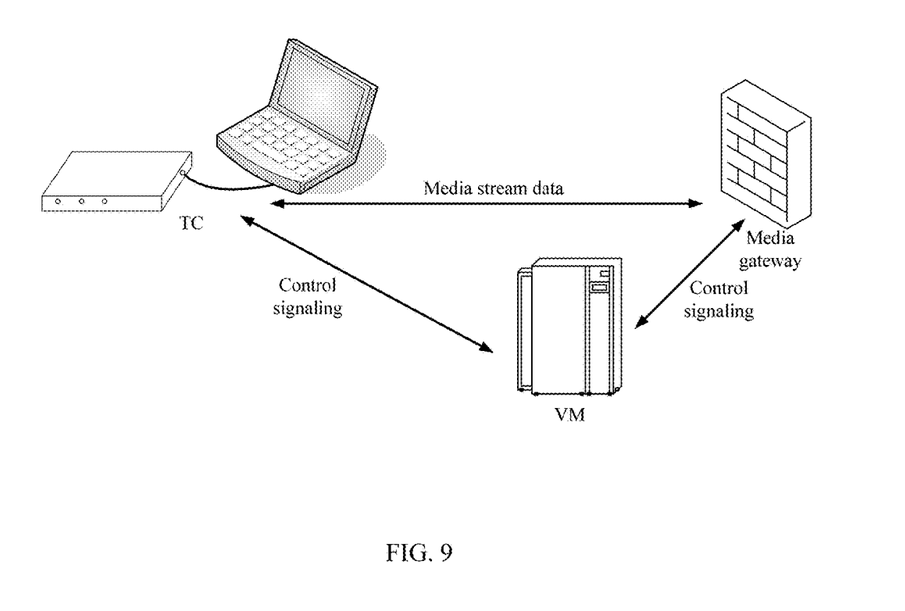
FIG. 9 is a diagram of a logical architecture to which the embodiment corresponding to FIG. 1 is applicable.

As shown in FIG. 9, before the establishment of the session between the TC and the media gateway, the TC and the media gateway may exchange control signaling through the VM. After the session is established, the TC and the media gateway can transmit media stream data directly by using the established session.

In this embodiment, after the TC sends the media stream transmission information of the TC to the VM, the VM sends the media stream transmission information of the TC to the media gateway and sends the obtained media stream transmission information of the media gateway to the TC, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

Figure 2:
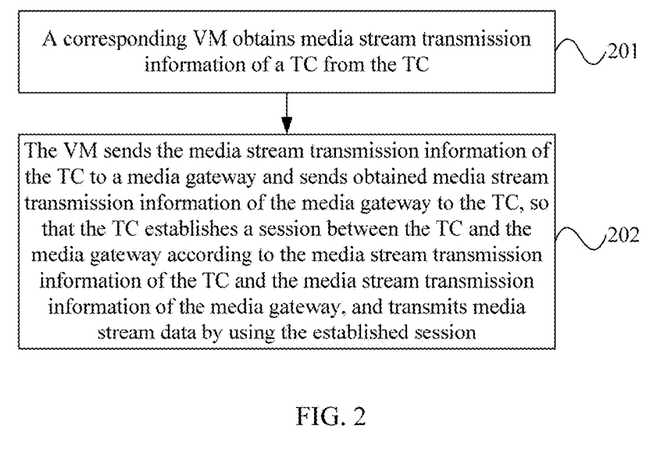
FIG. 2 is a schematic flowchart of a method for transmitting media stream data in a cloud computing system according to another embodiment of the present invention.

FIG. 2 is a schematic flowchart of a method for transmitting media stream data in a cloud computing system according to another embodiment of the present invention. In the cloud computing system, multiple VMs can run on each physical server and a TC can log in to a corresponding VM to perform communication services. As shown in FIG. 2, the method for transmitting media stream data in a cloud computing system in the embodiment of the present invention may include the following steps:

201. A corresponding VM obtains media stream transmission information of a TC from the TC.

The media stream transmission information of the TC may be media stream address information of the TC, for example, address information such as an IP address and a port number, or may further include media stream address information of the TC and media stream codec information supported by the TC, for example, voice codec methods such as G.723.1, G.711, or G.729.

202. The VM sends the media stream transmission information of the TC to a media gateway and sends obtained media stream transmission information of the media gateway to the TC, so that the TC establishes a session between the TC and the media gateway according to the media stream transmission information of the TC and the media stream transmission information of the media gateway, and transmits media stream data by using the established session.

The TC may send the media stream transmission information of the TC to the media gateway and sends the obtained media stream transmission information of the media gateway to the TC by using a media control protocol, such as an H.248 protocol, a SIP, or a MGCP.

The media stream transmission information of the media gateway may be media stream address information of the media gateway, for example, address information such as an IP address and a port number, or may further include media stream address information of the media gateway and media stream codec information supported by the media gateway, for example, voice codec methods such as G.723.1, G.711, or G.729.

Optionally, the TC may send the media stream address information of the TC and the media stream codec information supported by the TC to the VM, the VM then sends the media stream address information of the TC and the media stream codec information supported by the TC to the media gateway, and then the TC receives the media stream address information of the media gateway and the media stream codec information supported by the media gateway from the VM. The TC and the VM perform codec method negotiation and select a codec method they both support, so that according to the media stream address information of the TC and the media stream address information of the media gateway, the TC encodes, by using the selected codec method, media stream data to be sent and sends the encoded media stream data to the media gateway, and decodes, by using the selected codec method, encoded media stream data received from the media gateway to obtain the media stream data.

Optionally, the TC may not send media stream codec information supported by the TC to the VM, or, the VM may not send media stream codec information supported by the media gateway to the TC. That is, in scenarios where the TC does not obtain the media stream codec information supported by the media gateway, one codec method supported by the TC may be used. If the media gateway or the TC cannot decode media stream data correctly, another codec method is selected until the media gateway and the TC can both decode media stream data correctly.

In this embodiment, after the VM obtains the media stream transmission information of the TC from the TC, the VM sends the media stream transmission information of the TC to the media gateway and sends the obtained media stream transmission information of the media gateway to the TC, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

To make the method provided in the embodiments of the present invention clearer, a SIP and an H.248 protocol will be used for exemplary description.

Figure 3:
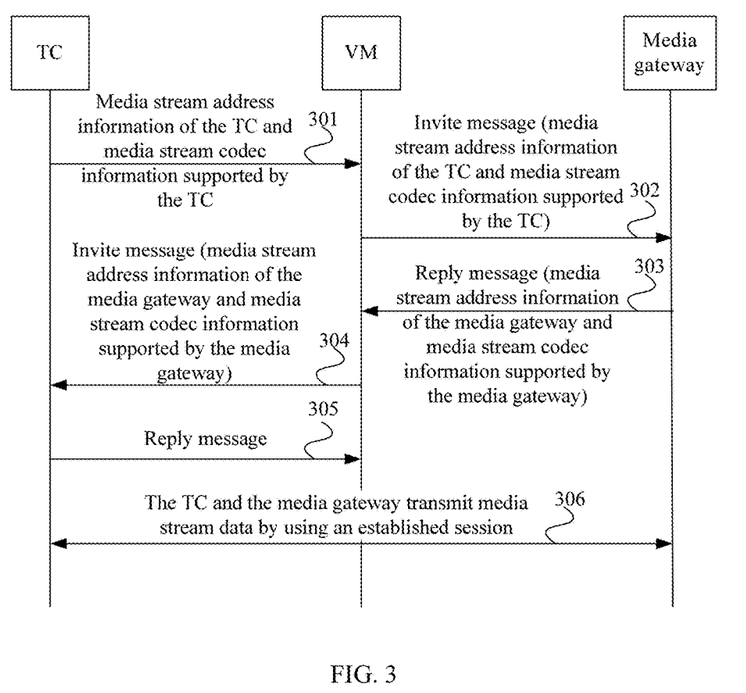
FIG. 3 is a schematic flowchart of a method for transmitting media stream data in a cloud computing system according to another embodiment of the present invention.

FIG. 3 is a schematic flowchart of a method for transmitting media stream data in a cloud computing system according to another embodiment of the present invention. This embodiment is applicable to scenarios where the SIP is adopted by a VM and a TC performs a calling communication service through the VM. As shown in FIG. 3, the method for transmitting media stream data in a cloud computing system in the embodiment of the present invention may include the following steps:

301. A TC registers with a VM to send media stream address information of the TC and media stream codec information supported by the TC to the VM.

302. The TC triggers the VM to send an Invite message to a media gateway, where the Invite message carries the media stream address information of the TC and the media stream codec information supported by the TC.

For example, the TC sends a calling operation instruction of a user to the VM, and the VM obtains, according to the instruction, the media stream address information of the TC and the media stream codec information supported by the TC that are sent by the TC to the VM at the time of registration, and sends an Invite message to the media gateway, where a message body of the message carries the media stream address information of the TC and the media stream codec information supported by the TC.

303. The media gateway sends a Reply message to the VM, where the Reply message carries media stream address information of the media gateway and media stream codec information supported by the media gateway.

304. The VM sends an Invite message to the TC, where the Invite message carries the media stream address information of the media gateway and the media stream codec information supported by the media gateway.

305. The TC sends a Reply message to the VM.

Optionally, the Reply message sent by the TC to the VM may further carry the media stream address information of the TC and the media stream codec information supported by the TC, so that the VM can determine, according to the media stream address information of the TC and the media stream codec information supported by the TC that are carried in the Reply message, whether the information sent by the TC at the time of registration has changed. If the information has changed, step 303 and step 304 may be executed again by using the changed media stream address information of the TC and media stream codec information supported by the TC.

Now, a session between the TC and the media gateway has been established.

306. The TC and the media gateway transmit media stream data by using the established session.

In this embodiment, after the VM obtains the media stream transmission information of the TC from the TC, a user triggers the VM through the TC to send the media stream transmission information of the TC to the media gateway and send the obtained media stream transmission information of the media gateway to the TC by using SIP, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

Figure 4:
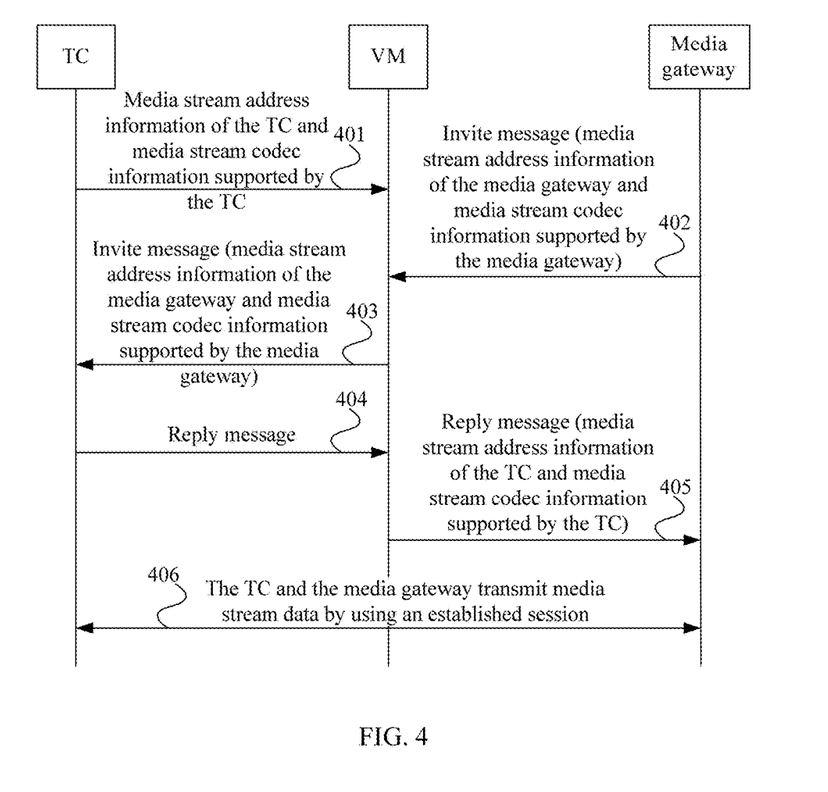
FIG. 4 is a schematic flowchart of a method for transmitting media stream data in a cloud computing system according to another embodiment of the present invention.

FIG. 4 is a schematic flowchart of a method for transmitting media stream data in a cloud computing system according to another embodiment of the present invention. This embodiment is applicable to scenarios where a SIP is adopted by a VM and a TC performs a called communication service through the VM. As shown in FIG. 4, the method for transmitting media stream data in a cloud computing system in the embodiment of the present invention may include the following steps:

401. A TC registers with a VM to send media stream address information of the TC and media stream codec information supported by the TC to the VM.

402. A calling party triggers a media gateway to send an Invite message to the VM, where the Invite message carries media stream address information of the media gateway and media stream codec information supported by the media gateway.

403. The TC triggers the VM to send an Invite message to the TC, where the Invite message carries the media stream address information of the media gateway and the media stream codec information supported by the media gateway.

For example, the TC sends an off-hook operation instruction of a user to the VM through the Remote Desktop Protocol, and, according to the instruction, the VM obtains the media stream address information of the media gateway and the media stream codec information supported by the media gateway that are sent by the media gateway to the VM, and sends an Invite message to the TC, where a message body of the message carries the media stream address information of the media gateway and the media stream codec information supported by the media gateway.

404. The TC sends a Reply message to the VM.

Optionally, the Reply message sent by the TC to the VM may further carry the media stream address information of the TC and the media stream codec information supported by the TC, so that the VM can determine, according to the media stream address information of the TC and the media stream codec information supported by the TC that are carried in the Reply message, whether the information sent by the TC at the time of registration has changed. If the information has changed, step 405 may be executed by using the changed media stream address information of the TC and media stream codec information supported by the TC.

405. The VM sends a Reply message to the media gateway, where the Reply message carries the media stream address information of the TC and the media stream codec information supported by the TC.

For example, the VM may obtain the media stream address information of the TC and the media stream codec information supported by the TC that are sent by the TC to the VM at the time of registration, and send a Reply message to the media gateway, where a message body of the message carries the media stream address information of the TC and the media stream codec information supported by the TC.

For another example, if the Reply message sent by the TC to the VM carries the media stream address information of the TC and the media stream codec information supported by the TC and the VM has determined that the information sent by the TC at the time of registration has changed, the VM may also send a Reply message to the media gateway by using the media stream address information of the TC and the media stream codec information supported by the TC that are sent by the TC to the VM in step 404, where a message body of the message carries the media stream address information of the TC and the media stream codec information supported by the TC.

Now, a session between the TC and the media gateway has been established.

406. The TC and the media gateway transmit media stream data by using the established session.

In this embodiment, after the VM obtains the media stream transmission information of the TC from the TC, a calling party triggers the VM through the media gateway to send the media stream transmission information of the TC to the media gateway and send the obtained media stream transmission information of the media gateway to the TC by using the SIP, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

Figure 5:
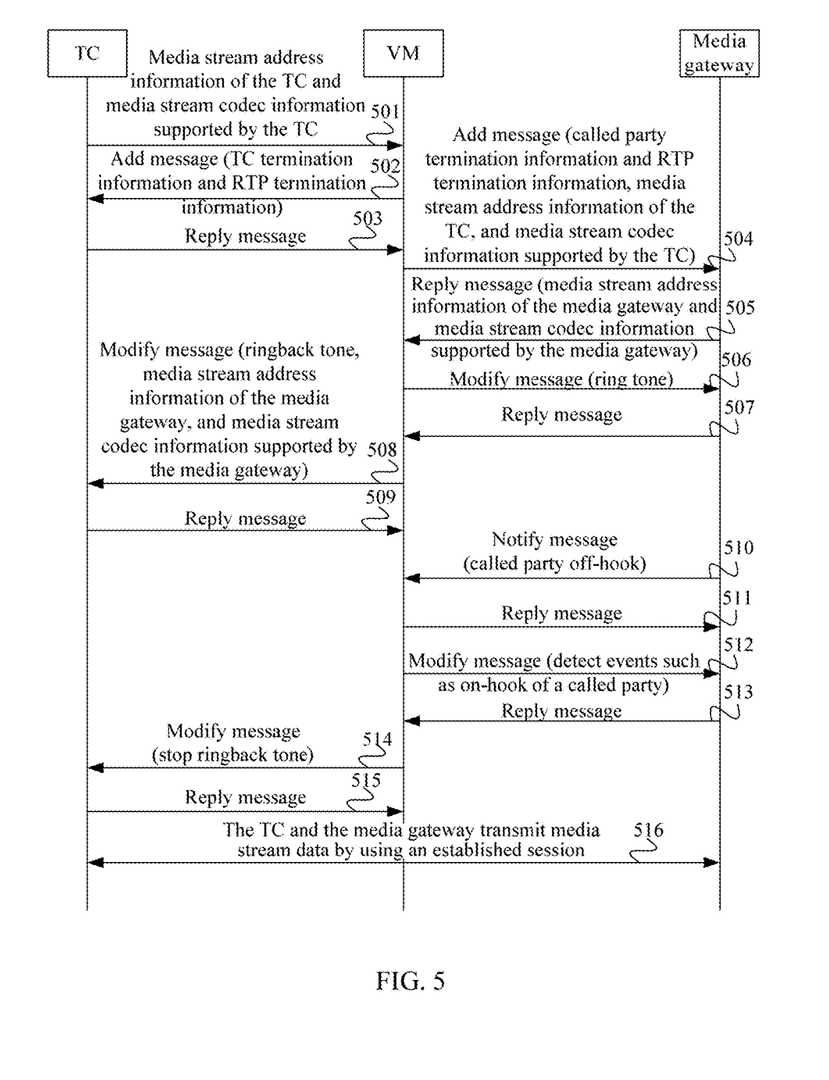
FIG. 5 is a schematic flowchart of a method for transmitting media stream data in a cloud computing system according to another embodiment of the present invention.

FIG. 5 is a schematic flowchart of a method for transmitting media stream data in a cloud computing system according to another embodiment of the present invention. This embodiment is applicable to scenarios where an H.248 protocol is adopted by a VM and a TC performs a calling communication service through the VM. As shown in FIG. 5, the method for transmitting media stream data in a cloud computing system in the embodiment of the present invention may include the following steps:

501. A TC registers with a VM to send media stream address information of the TC and media stream codec information supported by the TC to the VM.

502. The TC triggers the VM to send an Add message to the TC, where the Add message carries TC termination information and Real-time Transport Protocol (RTP) termination information, to create a new association.

For example, the TC sends a calling operation instruction of a user to the VM through the Remote Desktop Protocol, and, according to the instruction, the VM sends an Add message to the TC, where the Add message carries TC termination information and RTP termination information.

503. The TC sends a Reply message to the VM.

Optionally, the Reply message sent by the TC to the VM may further carry the media stream address information of the TC and the media stream codec information supported by the TC, so that the VM can determine, according to the media stream address information of the TC and the media stream codec information supported by the TC that are carried in the Reply message, whether the information sent by the TC at the time of registration has changed. If the information has changed, step 504 may be executed by using the changed media stream address information of the TC and media stream codec information supported by the TC.

504. The VM sends an Add message to a media gateway, where the Add message carries called party termination information, the RTP termination information, the media stream address information of the TC, and the media stream codec information supported by the TC, to create a new association.

For example, the VM may obtain the media stream address information of the TC and the media stream codec information supported by the TC that are sent by the TC to the VM at the time of registration, and send an Add message to the media gateway, where a message body of the message carries the media stream address information of the TC and the media stream codec information supported by the TC.

For another example, if the Reply message sent by the TC to the VM in step 503 carries the media stream address information of the TC and the media stream codec information supported by the TC and the VM has determined that the information sent by the TC at the time of registration has changed, the VM may also send an Add message to the media gateway by using the media stream address information of the TC and the media stream codec information supported by the TC that are sent by the TC to the VM in step 503, where a message body of the message carries the media stream address information of the TC and the media stream codec information supported by the TC.

505. The media gateway sends a Reply message to the VM, where the Reply message carries media stream address information of the media gateway and media stream codec information supported by the media gateway.

506. The VM sends a Modify message to the media gateway, where the Modify message carries a ring tone, so that the media gateway sends the ring tone to the called party.

507. The media gateway sends a Reply message to the VM.

508. The VM sends a Modify message to the TC, where the Modify message carries a ringback tone, the media stream address information of the media gateway, and the media stream codec information supported by the media gateway.

509. The TC sends a Reply message to the VM.

Optionally, the Reply message sent by the TC to the VM may further carry the media stream address information of the TC and the media stream codec information supported by the TC, so that the VM can determine, according to the media stream address information of the TC and the media stream codec information supported by the TC that are carried in the Reply message, whether the information sent by the TC at the time of registration has changed. If the information has changed, the changed media stream address information of the TC and media stream codec information supported by the TC may be sent to the media gateway by using a Modify message.

510. The called party triggers the media gateway to send a called party off-hook Notify message, to notify that the called party is off hook.

For example, the called party user is off hook and triggers the media gateway to send a called party off-hook Notify message to the VM.

511. The VM sends a Reply message to the media gateway.

512. The VM sends a Modify message to the media gateway, to detect events such as on-hook of a called party.

513. The media gateway sends a Reply message to the VM.

514. The VM sends a Modify message to the TC, to stop the ringback tone.

515. The TC sends a Reply message to the VM.

Now, a session between the TC and the media gateway has been established.

516. The TC and the media gateway transmit media stream data by using the established session.

In this embodiment, after the VM obtains the media stream transmission information of the TC from the TC, a user triggers the VM through the TC to send the media stream transmission information of the TC to the media gateway and send the obtained media stream transmission information of the media gateway to the TC by using the H.248 protocol, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

Figure 6:
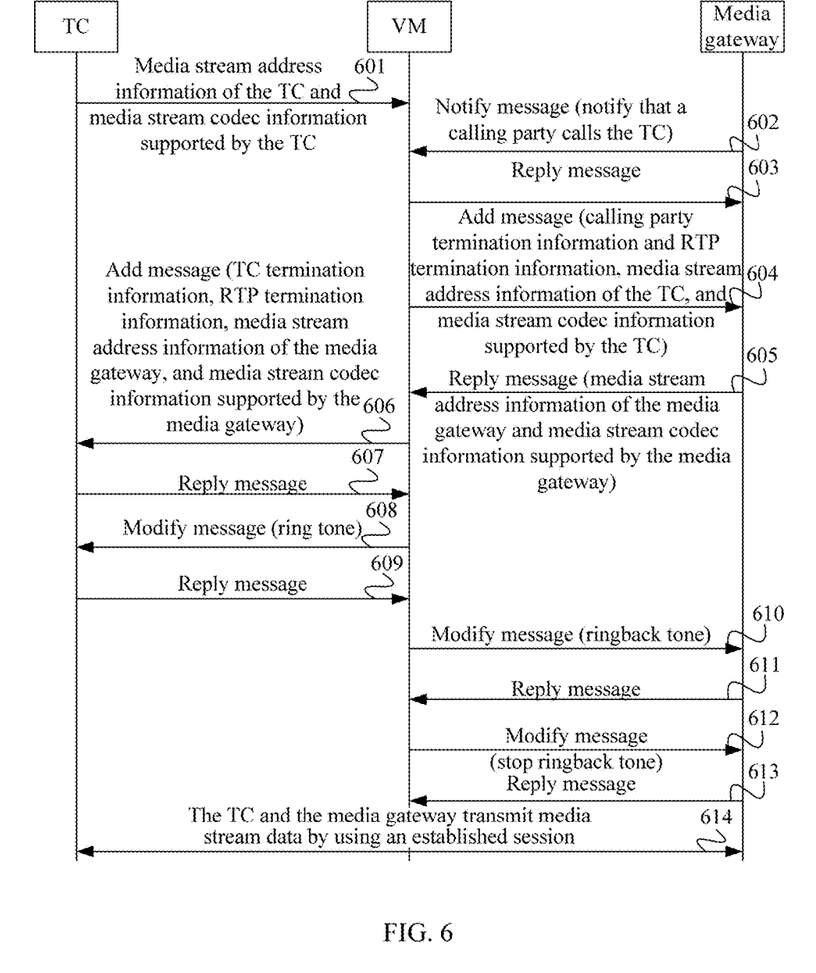
FIG. 6 is a schematic flowchart of a method for transmitting media stream data in a cloud computing system according to another embodiment of the present invention.

FIG. 6 is a schematic flowchart of a method for transmitting media stream data in a cloud computing system according to another embodiment of the present invention. This embodiment is applicable to scenarios where an H.248 protocol is adopted by a VM and a TC performs a called communication service through the VM. As shown in FIG. 6, the method for transmitting media stream data in a cloud computing system in the embodiment of the present invention may include the following steps:

601. A TC registers with a VM to send media stream address information of the TC and media stream codec information supported by the TC to the VM.

602. A calling party triggers a media gateway to send a Notify message to the VM, to notify that the calling party calls the TC.

603. The VM sends a Reply message to the media gateway.

604. The VM sends an Add message to the media gateway, where the Add message carries calling party termination information, RTP termination information, the media stream address information of the TC, and the media stream codec information supported by the TC, to create a new association.

605. The media gateway sends a Reply message to the VM, where the Reply message carries media stream address information of the media gateway and media stream codec information supported by the media gateway.

606. The VM sends an Add message to the TC, where the Add message carries TC termination information, RTP termination information, the media stream address information of the media gateway, and the media stream codec information supported by the media gateway.

607. The TC sends a Reply message to the VM.

Optionally, the Reply message sent by the TC to the VM may further carry the media stream address information of the TC and the media stream codec information supported by the TC, so that the VM can determine, according to the media stream address information of the TC and the media stream codec information supported by the TC that are carried in the Reply message, whether the information sent by the TC at the time of registration has changed. If the information has changed, the changed media stream address information of the TC and media stream codec information supported by the TC may be sent to the media gateway by using a Modify message.

608. The VM sends a Modify message to the TC, where the Modify message carries a ring tone.

609. The TC sends a Reply message to the VM.

610. The VM sends a Modify message to the media gateway, where the Modify message carries a ringback tone, so that the media gateway sends the ringback tone to the called party.

Optionally, if the Reply message sent by the TC to the VM in step 607 carries the media stream address information of the TC and the media stream codec information supported by the TC, and the VM has determined that the information sent by the TC at the time of registration has changed, the VM may add the changed media stream address information of the TC and media stream codec information supported by the TC to the Modify message.

611. The media gateway sends a Reply message to the VM.

Optionally, the Reply message sent by the media gateway to the VM may further carry the media stream address information of the media gateway and the media stream codec information supported by the media gateway, so that the VM can determine, according to the media stream address information and the media stream codec information supported by the media gateway that are carried in the Reply message, whether the media stream address information and the media stream codec information supported by the media gateway that are obtained in step 605 have changed. If the information has changed, the VM may send the changed media stream address information of the media gateway and media stream codec information supported by the media gateway to the TC by using a Modify message.

612. The TC triggers the VM to send a Modify message to the media gateway, to stop the ringback tone.

For example, the TC sends an off-hook operation instruction of the user to the VM through the Remote Desktop Protocol, and according to the instruction, the VM detects events such as TC disconnect and sends a Modify message to the media gateway to stop the ringback tone.

613. The media gateway sends a Reply message to the VM.

Now, a session between the TC and the media gateway has been established.

614. The TC and the media gateway transmit media stream data by using the established session.

In this embodiment, after the VM obtains the media stream transmission information of the TC from the TC, a user triggers the VM through the TC to send the media stream transmission information of the TC to the media gateway and send the obtained media stream transmission information of the media gateway to the TC by using the H.248 protocol, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

It should be noted that, for ease of description, the foregoing method embodiments are all described as combinations of actions but persons skilled in the art should know that the present invention is not limited to the described sequences of actions. According to the present invention, some steps may be executed in other sequences or executed simultaneously. Also, persons skilled in the art should know that the embodiments described herein are merely exemplary embodiments, where the actions and modules included are not mandatory for the present invention.

In the foregoing embodiments, the descriptions of the embodiments have different stresses, and, for what is not described in one embodiment, reference may be made to related descriptions in other embodiments.

Figure 7:
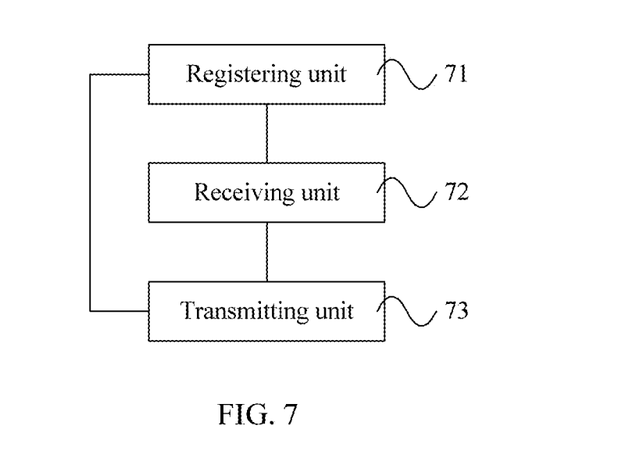
FIG. 7 is a schematic structural diagram of a TC in a cloud computing system according to another embodiment of the present invention.

FIG. 7 is a schematic structural diagram of a TC in a cloud computing system according to another embodiment of the present invention. In the cloud computing system, multiple VMs can run on each physical server and a TC can log in to a corresponding VM to perform communication services. As shown in FIG. 7, the TC in this embodiment may include a registering unit 71, a receiving unit 72, and a transmitting unit 73. The registering unit 71 is configured to send media stream transmission information of the TC to a corresponding VM, so that the VM sends the media stream transmission information of the TC to a media gateway. The receiving unit 72 is configured to receive media stream transmission information of the media gateway from the VM. The transmitting unit 73 is configured to establish a session between the TC and the media gateway according to the media stream transmission information of the TC and the media stream transmission information of the media gateway, and transmits media stream data by using the established session.

Functions of the TC in the embodiments corresponding to FIG. 1, FIG. 3, and FIG. 4 can all be implemented by the TC provided in this embodiment.

Further, the registering unit 71 in this embodiment may further obtain configured media stream transmission information of the TC.

The receiving unit 72 in this embodiment may send the media stream transmission information of the TC to the media gateway and receive the media stream transmission information of the media gateway from the VM by using a media control protocol such as an H.248 protocol, a SIP, or an MGCP.

For example, the receiving unit 72 may specifically receive an Invite message sent by the VM, where the Invite message carries the media stream transmission information of the media gateway; or receive a Modify message sent by the VM, where the Modify message carries the media stream transmission information of the media gateway; or receive an Add message sent by the VM, where the Add message carries the media stream transmission information of the media gateway.

In this embodiment, after the registering unit sends the media stream transmission information of the TC to the VM, the VM sends the media stream transmission information of the TC to the media gateway and sends the obtained media stream transmission information of the media gateway to the receiving unit, so that the transmitting unit can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

Figure 8:
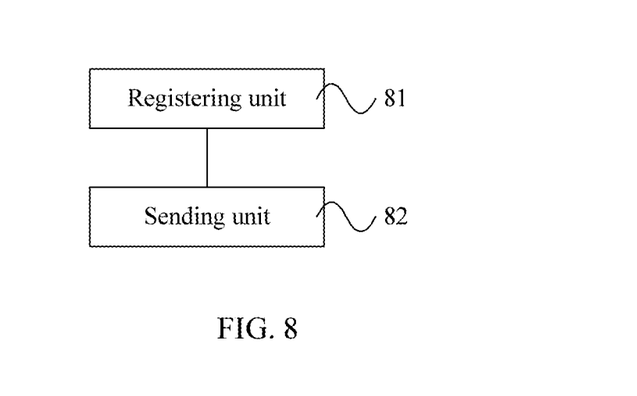
FIG. 8 is a schematic structural diagram of a VM in a cloud computing system according to another embodiment of the present invention.

FIG. 8 is a schematic structural diagram of a VM in a cloud computing system according to another embodiment of the present invention. In the cloud computing system, multiple VMs can run on each physical server and a TC can log in to a corresponding VM to perform communication services. As shown in FIG. 8, the VM in this embodiment may include a registering unit 81 and a sending unit 82. The registering unit 81 is configured to obtain media stream transmission information of a TC from the TC. The sending unit 82 is configured to send the media stream transmission information of the TC obtained by the registering unit 81 to a media gateway, and send obtained media stream transmission information of the media gateway to the TC, so that the TC establishes a session between the TC and the media gateway according to the media stream transmission information of the TC and the media stream transmission information of the media gateway, and transmits media stream data by using the established session.

Functions of the VM in the embodiments corresponding to FIG. 2, FIG. 3, and FIG. 4 can all be implemented by the VM provided in this embodiment.

The sending unit 82 in this embodiment may send the media stream transmission information of the TC to the media gateway and send the obtained media stream transmission information of the media gateway to the TC by using a media control protocol such as an H.248 protocol, a SIP, or an MGCP.

For example, the sending unit may specifically send a first Invite message to the media gateway, where the first Invite message carries the media stream transmission information of the TC, and send a second Invite message to the TC, where the second Invite message carries the media stream transmission information of the media gateway. Or, the sending unit may send a third Invite message to the TC, where the third Invite message carries the media stream transmission information of the media gateway, and send a Reply message to the media gateway, where the Reply message carries the media stream transmission information of the TC. Or, the sending unit may send a first Add message to the media gateway, where the first Add message carries the media stream transmission information of the TC, and send a Modify message to the TC, where the Modify message carries the media stream transmission information of the media gateway. Or, the sending unit may send a second Add message to the media gateway, where the second Add message carries the media stream transmission information of the TC, and send a third Add message to the TC, where the third Add message carries the media stream transmission information of the media gateway.

In this embodiment, after the registering unit obtains the media stream transmission information of the TC from the TC, the sending unit sends the media stream transmission information of the TC to the media gateway and sends the obtained media stream transmission information of the media gateway to the TC, so that the TC can establish a session between the TC and the media gateway and transmit media stream data by using the established session, which reduces the transmission delay. In addition, because media stream data does not pass through the VM, the VM does not need to encode or decode media stream data, and therefore the CPU occupation rate of the VM will not be high. As a result, the quantity of VMs that can run on a corresponding physical server can be further increased so as to improve the resource utilization rate of the physical server.

It can be clearly understood by persons skilled in the art that, for the purpose of convenient and brief description, reference may be made to the corresponding processes in the foregoing method embodiments for detailed working processes of the foregoing system, apparatuses, and units, which will not be described herein again.

In the several embodiments provided in the present application, it should be understood that the disclosed system, apparatus, and method may be implemented in other manners. For example, the described apparatus embodiments are merely exemplary. For example, the division of units is merely a logical division of functions and there may be other divisions in actual implementation. For example, a plurality of units or components may be combined or integrated into another system, or some features may be ignored or not executed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and a part displayed as a unit may or may not be a physical unit, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in form of hardware, or may also be implemented in form of hardware plus a software functional unit.

The integrated unit implemented in form of a software functional unit may be stored in a computer readable storage medium. The software functional unit is stored in a storage medium and includes several instructions to instruct a computer device (which may be a personal computer, a server, or a network device or the like) to execute part of the steps of the methods in the embodiments of the present invention. The foregoing storage medium includes: any medium capable of storing program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for transmitting media stream data in a cloud computing system, comprising:
    sending, by a thin client (TC), media stream transmission information of the TC to a virtual machine (VM), the cloud computing system comprising a physical server on which the VM runs, the TC being used for logging in to the VM, and the TC and the VM communicating through remote desktop protocol;

receiving, by the TC from the VM, media stream transmission information of a media gateway;

establishing, by the TC, a session between the TC and the media gateway according to the media stream transmission information of the TC and the media stream transmission information of the media gateway; and transmitting the media stream data of a call using the established session between the TC and the media gateway, the media stream data of the call not passing through the VM.

2. The method of claim 1, wherein the media stream transmission information of the TC comprises media stream address information of the TC, and the media stream transmission information of the media gateway comprises the media stream address information of the media gateway.

3. The method of claim 1, wherein the media stream transmission information of the TC comprises media stream address information of the TC, and the media stream transmission information of the media gateway comprises the media stream address information of the media gateway and media stream codec information supported by the media gateway.

4. The method of claim 1, wherein the media stream transmission information of the TC comprises media stream address information of the TC and media stream codec information supported by the TC, and the media stream transmission information of the media gateway comprises the media stream address information of the media gateway.

5. The method of claim 1, wherein the media stream transmission information of the TC comprises media stream address information of the TC and media stream codec information supported by the TC, and the media stream transmission information of the media gateway comprises the media stream address information of the media gateway and the media stream codec information supported by the media gateway.

6. The method of claim 1, wherein sending, by the TC, the media stream transmission information of the TC to the VM comprises registering, by the TC, with the VM to send the media stream transmission information of the TC to the VM.

7. The method of claim 6, wherein before registering, by the TC, with the VM to send the media stream transmission information of the TC to the VM, the method further comprises:

configuring the media stream transmission information on the TC; and obtaining, by the TC, the configured media stream transmission information of the TC.

8. The method of claim 1, wherein receiving, by the TC, media stream transmission information of the media gateway comprises receiving, by the TC, the media stream transmission information of the media gateway from the VM using a media control protocol.

9. The method of claim 8, wherein receiving, by the TC, the media stream transmission information of the media gateway from the VM using the media control protocol comprises receiving, by the TC, an Invite message sent by the VM when the media control protocol is a Session Initiation Protocol (SIP), and the Invite message carries the media stream transmission information of the media gateway.

10. The method of claim 8, wherein receiving, by the TC, the media stream transmission information of the media gateway from the VM using the media control protocol comprises receiving, by the TC, a Modify message sent by the VM when the media control protocol is an H.248 protocol, and the Modify message carries the media stream transmission information of the media gateway.

11. The method of claim 8, wherein receiving, by the TC, the media stream transmission information of the media gateway from the VM using the media control protocol comprises receiving, by the TC, an Add message sent by the VM when the media control protocol is an H.248 protocol, and the Add message carries the media stream transmission information of the media gateway.

12. A method for transmitting media stream data in a cloud computing system, comprising:

receiving, by a virtual machine (VM), media stream transmission information of a thin client (TC) from the TC, the cloud computing system comprising a physical server on which the VM runs, the TC being used for logging in to the VM, and the TC and the VM communicating through remote desktop protocol;

sending, by the VM, media stream transmission information of a media gateway to the TC after the VM obtains the media stream transmission information of the media gateway.

13. The method of claim 12, wherein the media stream transmission information of the TC comprises media stream address information of the TC, and the media stream transmission information of the media gateway comprises the media stream address information of the media gateway.

14. The method of claim 12, wherein the media stream transmission information of the TC comprises media stream address information of the TC, and the media stream transmission information of the media gateway comprises the media stream address information of the media gateway and media stream codec information supported by the media gateway.

15. The method of claim 12, wherein the media stream transmission information of the TC comprises media stream address information of the TC and media stream codec information supported by the TC, and the media stream transmission information of the media gateway comprises the media stream address information of the media gateway.

16. The method of claim 12, wherein the media stream transmission information of the TC comprises media stream address information of the TC and media stream codec info Illation supported by the TC, and the media stream transmission information of the media gateway comprises the media stream address information of the media gateway and the media stream codec information supported by the media gateway.

17. The method of claim 12, wherein receiving, by the VM, media stream transmission information of the TC comprises receiving, by the VM, the media stream transmission information of the TC when the TC registers with the VM.

18. The method of claim 12, wherein the method further comprises sending, by the VM, media stream transmission information of the TC to the media gateway using a media control protocol, and the media control protocol includes Session Initiation Protocol (SIP) or H.248 protocol.

19. A non-transitory computer readable medium containing computer-executable instructions for transmitting media stream data in a cloud computing system, the computer-executable instructions, when executed by a processor of a thin client (TC), causing the TC to perform operations comprising:

sending media stream transmission information of the TC to a virtual machine (VM), the cloud computing system comprising a physical server on which the VM runs, the TC being used for logging in to the VM, and the TC and the VM communicating through remote desktop protocol;

receiving media stream transmission information of a media gateway from the VM;

establishing a session between the TC and the media gateway according to the media stream transmission information of the TC and the media stream transmission information of the media gateway; and transmitting the media stream data of a call using the established session between the TC and the media gateway, the media stream data of the call not passing through the VM.

20. A non-transitory computer readable medium containing computer-executable instructions for transmitting media stream data in a cloud computing system, the computer-executable instructions, when executed by a processor of a physical server, causing the physical server to perform operations comprising:

receiving media stream transmission information of a thin client (TC) from the TC, the cloud computing system comprising the physical server on which a virtual machine (VM) runs, the TC being used for logging in to the VM, and the TC and the VM communicating through remote desktop protocol;

sending media stream transmission information of a media gateway to the TC after the VM obtains the media stream transmission information of the media gateway.

* * * * *

UNITED STATES PATENT AND TRADEMARK OFFICE
CERTIFICATE OF CORRECTION

PATENT NO. : 10,313,407 B2
APPLICATION NO. : 14/862752
DATED : June 4, 2019
INVENTOR(S) : Houqing Li, Youying Li and Chaolin Qiao Page 1 of 1

It is certified that error appears in the above-identified patent and that said Letters Patent is hereby corrected as shown below:

On the Title Page

Item (57), Line 9: "directly by taste" should read "directly by using"

Page (2), Item (56), OTHER PUBLICATIONS, Line 21: "Dffice" should read "Office"

In the Claims

Column 16, Line 45: "codec info lllation" should read "codec information"

Signed and Sealed this
First Day of October, 2019

Andrei Iancu
*Director of the United States Patent and Trademark Office*